US012784395B2

(12) United States Patent
Ramamohan

(10) Patent No.: US 12,784,395 B2
(45) Date of Patent: Nov. 3, 2026

(54) APPLYING A SEGMENTATION MASK OF AN IMAGE

(71) Applicant: Capital One Services, LLC, McLean, VA (US)

(72) Inventor: Deepak Ramamohan, Mysuru (IN)

(73) Assignee: Capital One Services, LLC, McLean, VA (US)

( * ) Notice: Subject to any disclaimer, the term of this patent is extended or adjusted under 35 U.S.C. 154(b) by 101 days.

(21) Appl. No.: 18/919,533

(22) Filed: Oct. 18, 2024

(65) Prior Publication Data

US 2026/0112143 A1 Apr. 23, 2026

(51) Int. Cl.

| | |
|---|---|
| ***G06K 9/34*** | (2006.01) |
| ***G06V 10/26*** | (2022.01) |
| ***G06V 10/32*** | (2022.01) |
| ***G06V 10/34*** | (2022.01) |
| ***G06V 10/44*** | (2022.01) |

(52) U.S. Cl.

CPC .............. *G06V 10/34* (2022.01); *G06V 10/26* (2022.01); *G06V 10/32* (2022.01); *G06V 10/44* (2022.01); *G06V 2201/08* (2022.01)

(58) Field of Classification Search

CPC ........ G06V 10/34; G06V 10/26; G06V 10/32; G06V 10/44; G06V 2201/08

See application file for complete search history.

(56) References Cited

U.S. PATENT DOCUMENTS

| | | | | |
|---|---|---|---|---|
| 9,171,372 | B2 | 10/2015 | Zhang et al. | |
| 11,613,201 | B2 | 3/2023 | Li et al. | |
| 11,809,998 | B2 | 11/2023 | Mao et al. | |
| 12,394,060 | B2 * | 8/2025 | Gao | G06T 7/12 |
| 2022/0406079 | A1 * | 12/2022 | Pilutti | G06T 7/0012 |
| 2023/0099494 | A1 | 3/2023 | Kocamaz et al. | |
| 2023/0118460 | A1 * | 4/2023 | Liba | G06T 5/77 |
| 2024/0221162 | A1 * | 7/2024 | Xie | G06T 7/70 |

FOREIGN PATENT DOCUMENTS

| | | | | |
|---|---|---|---|---|
| CN | 112052839 A | * 12/2020 | | G06N 3/045 |
| CN | 116453147 A | 7/2023 | | |

* cited by examiner

*Primary Examiner* — Xin Jia

(74) *Attorney, Agent, or Firm* — Sterne, Kessler, Goldstein & Fox P.L.L.C.

(57) ABSTRACT

Disclosed herein are system, method, and computer program product embodiments for extracting an image object, such as a vehicle, from background imagery for computer browsing. The method includes generating a first segmentation mask of an image object, wherein the first segmentation mask comprises at least an array of first pixels of the image object within the digital imagery and second pixels located outside a perimeter boundary of the first segmentation mask (strays); extracting a plurality of contours from the digital imagery; generating a contour hierarchy of the plurality of contours, wherein the hierarchy is based on a length of each of the contours; discarding, based on the contour hierarchy, all contours from the plurality of contours except a longest contour; filling an interior of the longest contour to generate a second segmentation mask; and extracting the image object from the digital imagery using the second segmentation mask.

20 Claims, 8 Drawing Sheets

402

404

604

702

APPLYING A SEGMENTATION MASK OF AN IMAGE

BACKGROUND

A number of techniques currently exist to enable identifying foreground image objects in imagery. However, lagging behind are improvements to systems where, during an online shopping experience, a user can view extracted image objects that appear realistic.

BRIEF DESCRIPTION OF THE DRAWINGS/FIGURES

In the drawings, like reference numbers generally indicate identical or similar elements. Additionally, generally, the left-most digit(s) of a reference number identifies the drawing in which the reference number first appears.

DETAILED DESCRIPTION OF THE INVENTION

Provided herein are system, apparatus, device, method and/or computer program product embodiments, and/or combinations and sub-combinations thereof, for extracting foreground imagery for an image object from imagery. A segmentation mask may include contiguous pixels of the image object. The segmentation mask is essentially an array that identifies each pixel as either belonging to the foreground, i.e., vehicle in this example embodiment, or the background. However, the segmentation mask may also include unwanted "stray" segments. For example, background objects may be incorrectly marked as foreground. In various embodiments, technical improvements are disclosed to improve the segmentation mask by removal of these stray segments, smoothing edges of the segmentation mask and preserving the foreground when applying the mask to an image.

Many car buyers will shop for vehicles online in order to browse the cars without traveling to a location of the vehicle. Consistent imagery with realistic image objects may enhance or improve the browsing experience. In various embodiments, an imaging process may generate a segmentation mask of an image object (e.g., one obtained after passing an image through a segmentation algorithm), remove stray segments from the mask, smooth the edges of the segmentation mask and apply the updated mask to remove background imagery while preserving the foreground image object (e.g., a vehicle). Typically, the orientation of vehicle image object is such that its front and left sides are visibly defined as a front-left orientation. Note, however, that the proposed solution, in the embodiments disclosed herein, may be equally extended to front-right images.

Various embodiments of these features will now be discussed with respect to the corresponding figures.

Figure 1:
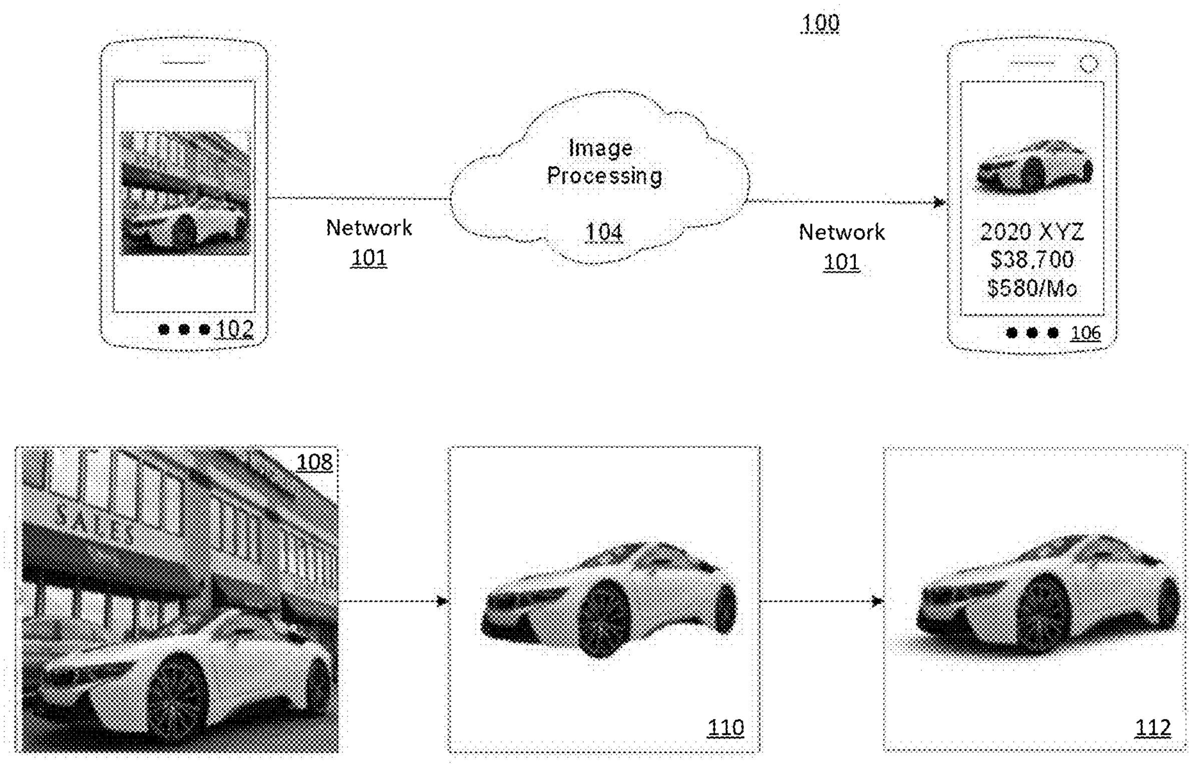
FIG. 1 depicts an illustration of a system for implementing image oriented shopping using extracted foreground imagery for an image object, according to some embodiments.

FIG. 1 depicts an illustration of a system 100 for implementing image oriented shopping using extracted foreground imagery for an image object, according to some embodiments. System 100 will be described throughout for an example vehicle image object. However, the system and processes described herein may be applied to any imagery to separate a foreground image object from background imagery.

System 100 may include a vehicle owner (e.g., private or dealership) interacting with a camera device 102 (e.g., a smartphone) to generate on-site vehicle imagery 108. The vehicle imagery 108 may be communicated to a local, remote, or a distributed computing system, such as image processing system 104, to execute image processing steps with an imaging application to separate a foreground vehicle image object from background imagery.

Image processing system 104 may include one or more server devices (e.g., a host server, a web server, an application server, etc.), a data center device, or a similar device, capable of communicating with camera device 102 via network 101. The server may include an image processor, authenticator, image recognizer, object classifier, model generator, and object database. In some embodiments, the server may be implemented as a plurality of servers that function collectively as a cloud database for storing/processing imagery and data received from camera device 102. The plurality of servers can be co-located at a single location (e.g., server farm) or be geographically distributed across multiple locations and/or multiple servers. In some embodiments, the server may be used to store the vehicle imagery 108, an extracted image object 110, an image with shadows 112, a segmentation mask, or vehicle information.

Collectively, object processor and authenticator may perform security functions described above for an image application including processing the object information, processing requests associated with accessing, uploading, and deleting files, just to name a few examples. Instead of processing image information locally in camera device 102, camera device 102 may send the image information to the server to perform the processing remotely. An authenticator may be used to authenticate user or location information and encrypt/decrypt data based on information provided by camera device 102. The object database stores objects and associated information. Like object storage, the object database may, in some aspects, differ from conventional storage in that it is configured specifically to store unstructured data associated with objects as a single element.

User device 106 may be connected to the image processing system 104 or to a dealer's system (e.g., server platform) through wired or wireless communication networks 101 to receive and render (e.g., display) a chosen object (e.g., vehicle or vehicles) on a computing device display. User device 106 may include a device, such as a mobile phone (e.g., a smart phone, a radiotelephone, etc.), a laptop computer, a personal computer, a tablet computer, a handheld computer, a gaming device, a wearable communication device (e.g., a smart wristwatch, a pair of smart eyeglasses, augmented reality headsets, interactive heads-up display (HUD), etc.), or a similar type of device. In some embodiments, user device 106 may include a location sensor for location based searching of available vehicles for purchase. Examples of location sensors include any combination of a global position system (GPS) sensor, a digital compass, a IR distance measurement element, cameras with associated camera position solving software, velocimeter (velocity meter), an accelerometer or any known or future location systems.

While described as separate from image processing system 104, a dealer's system may be implemented as one or more servers located in the cloud, another cloud processing system or by a local or remote dealership server network. Dealer System may include one or more servers or databases such as an inventory database, storing existing vehicle inventory as identified, for example, by a vehicle ID. A vehicle information database may store specific vehicle information (pricing, features, options, color, specifications (e.g., drivetrain information, horsepower, torque, length, width, height, etc.) associated with a vehicle ID in the existing inventory. An image database may ingest imagery of vehicles in inventory from various sources such as mobile devices with cameras, fixed cameras, etc. Also, the dealer may ingest imagery of same or different vehicles from the internet, social media, or third-party apps.

In some embodiments, when interacting with a physical object, the image application may require multiple images and/or a panoramic view of the physical object. Multiple images from different camera views and angles may be required so that subsequent access is not limited to only one camera angle. These multiple images could then be stored as part of the image object information.

In some embodiments, the image application may also include image processing capabilities to remove certain information or features from an image of the object (e.g., taken from the real-time view) to prevent the chances of false segmentation mask elements (e.g., stray pixels or holes in the vehicle profile) or improper identifications in a vehicle search. For example, if stray segments are included as part of the captured object information, accessing the storage location associated with that vehicle at a later time could require the same stray segments to appear in order to provide subsequent identification. To avoid that situation, the image application may remove the background from the vehicle imagery 108, remove the stray segments, and store that processed image of the image object 110 as object information (e.g., segmentation mask) in a storage location. In this manner, recognizing the vehicle would not be dependent on the specific circumstances of the object when the object was originally created.

In some embodiments, camera device 102 may include hardware components for displaying a real-time view of the physical surroundings in which camera device 102 is used. The camera device 102 may also support one or more image resolutions. In some embodiments, an image resolution may be represented as a number of pixel columns (width) and a number of pixel rows (height), such as 1280×720, 1920×1080, 2592×1458, 3840×2160, 4128×2322, 5248×2952, 5312×2988, or the like, where higher numbers of pixel columns and higher numbers of pixel rows are associated with higher image resolutions.

In some embodiments, camera device 102 may be implemented using one or more camera lenses with each lens having different focal lengths or different capabilities. For example, there may be a wide-angle lens (e.g., 18-35 mm), a telephoto (zoom) lens (e.g., 55 mm and above), a lens with a depth sensor, a lens with a monochrome sensor, or a "standard" lens (e.g., 35-55 mm). Determining a depth of field may be calculated using a dedicated lens having a depth sensor (e.g., Light Detection and Ranging (LIDAR)) or using multiple camera lenses (e.g., telephoto lens in combination with a standard lens).

In some embodiments, the determined distance or depth between camera device 102 and the object may be used to determine a relative location of the object. The relative location of the object refers to the spatial relationship between the object and surrounding objects. The relative location may be used in combination with the physical location to identify the object.

In some embodiments, camera device 102 may also be used to detect the contour of objects displayed in the real-time view. Contour information for each object may be stored as object information. Some object information may be available and/or more accurate when camera device 102 is implemented using more than one camera lens. For example, camera device 102 may be implemented with three camera lenses could be more accurate in acquiring depth of field information and determining the exact relative position and contour between different objects. A contour may generally be considered to be three-dimensional information associated with the object.

In one example, the image application may take advantage of the different capabilities of each lens in performing its object detection and analysis. For example, one lens may be configured to recognize lighting in the real-time view and can distinguish between day and night clearly; an ultra-wide-angle lens can support wide-angle picture shooting and captures additional details regarding objects surrounding the selected object; yet another lens may be a telephoto lens which supports optical zoom to capture specific details regarding the selected object. The image application may then utilize the information provided by each lens of camera device 102 for not only identifying objects within real-time view but also securely storing and accessing data. In this manner, the image application may be tailored to the capabilities of camera device 102 while still providing the complete functionality as described in this disclosure.

In some embodiments, object information (e.g., contour, size, color, shape) may also be used when verifying that a selected object matches the object that is associated with a location. For example, when the vehicle information is created, an image object 110 of the physical object may be stored as part of the creation process. When subsequent access to the vehicle location is requested, the image application may determine that the subsequent access is associated with the same physical object that was used to create the vehicle data. In some embodiments, this may be done via an image comparison between an image of the object that was previously stored and an image of the object that is provided with the request.

In some embodiments, the camera device 102 may support a first image resolution that is associated with a quick capture mode, such as a low image resolution for capturing and displaying low-detail preview images on a display of the user device. In some embodiments, the camera device 102 may support a second image resolution that is associated with a full capture mode, such as a high image resolution for capturing a high-detail image. In some embodiments, the full capture mode may be associated with the highest image resolution supported by the camera device 102.

Network 101 may include one or more wired and/or wireless networks. For example, the network 101 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

Figure 2:
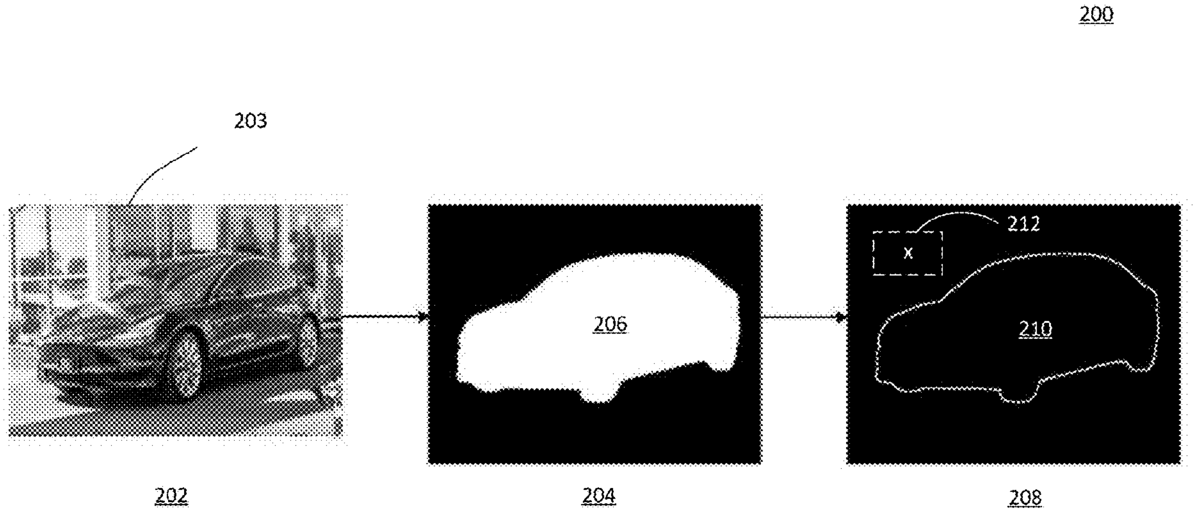
FIG. 2 depicts a high-level illustration for extracting image objects, according to some embodiments.

FIG. 2 depicts a high-level illustration for extracting image objects, according to some embodiments. As a non-limiting example with regard to FIG. 1, one or more processes described with respect to FIGS. 2-7 may be performed by an image processing system (e.g., image processing system 104 of FIG. 1) or a server for processing imagery associated with a physical object that is displayable on a computing device (e.g., mobile device 106).

In one processing stage 202, segmentation mask 206 may be generated by partitioning digital image 203 into multiple image segments, also known as image regions or image objects (e.g., sets of pixels). The result of image segmentation is a set of segments that collectively cover the entire image object.

In one processing stage 204, the foreground image object (e.g., vehicle) pixels may subsequently be separated from the background pixels using the segmentation mask and identifying boundaries (lines, curves, contours, etc.) of the image object.

In one processing stage 208, the image application generates a contour 210 from the segmentation mask 206. A set of contours (e.g., edges) may be extracted from the image by defining an array of points along the 'boundary' of the mask, which generally follows a closed curve.

In some scenarios, stray segment(s) 212 (e.g., pixels having properties similar to the image object), may be associated with the segmentation mask 206. As will be described in greater detail in FIG. 3, in one embodiment, the largest contour and its children (e.g., contours interior to the largest contour) are selected and the remaining segments are filtered (e.g., discarded) from the imagery to remove the strays.

Figure 3:
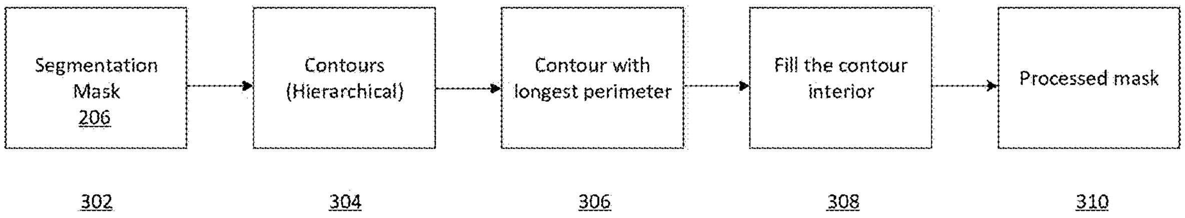
FIG. 3 depicts a flow diagram for implementing a segmentation mask process for an image object, according to some embodiments.

FIG. 3 depicts a flow diagram for implementing a segmentation mask process for an image object, according to some embodiments. Operations described may be implemented by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 3, as will be understood by a person of ordinary skill in the art.

In one processing stage 302, the image application may generate a segmentation mask 206 by partitioning the vehicle imagery into multiple image segments, also known as image regions or image objects (e.g., sets of pixels). Segmentation mask 206, includes the contiguous pixels of the object, but also may include unwanted pixels along the contours of the object or areas where holes in the mask may exist. For example, the segmentation mask may include at least an array of contiguous pixels of the image object within the digital imagery as well as additional pixels (e.g., strays) located outside a perimeter boundary of the image object's segmentation mask.

In some embodiments, a set of contours (e.g., edges) may be extracted from the segmentation mask by defining an array of points along the boundary of the mask, which generally follows at least a partially closed curve. Each of the pixels in a region may be similar with respect to some characteristic or computed property, such as color, intensity, or texture, to name a few. However, unwanted contour segments formed from stray pixels may be included in a first version of the segmentation mask.

In one processing stage 304, an analysis of contours, by size, may be implemented to identify relative sizes of detected contours (e.g., closed curves) of the segmentation mask 206. The analysis may generate a hierarchical listing of contours by size (e.g., perimeter lengths). The hierarchy of contours may include a contour which is enclosed by another contour and may therefore become a child of the latter. Contours of stray segments, by definition, may be outside the boundaries of the main image object, and therefore form their own separate hierarchies. This hierarchical structure, along with the perimeter of the contour corresponding to the root of the hierarchy, may be used to determine which contour within a hierarchy is retained, while the rest may be discarded.

In one processing stage 306, a contour with a longest perimeter may selected from the hierarchical listing, which may be chosen to identify the region of contiguous pixels of the segmentation mask of the image object, but, by only selecting the longest contour, may eliminate the shorter unwanted stray segments.

In one processing stage 308, an interior region of the largest contour may be filled with a common pixel. For example, white or black regions may identify the image object by masking the entire area of the image object.

Figure 5:
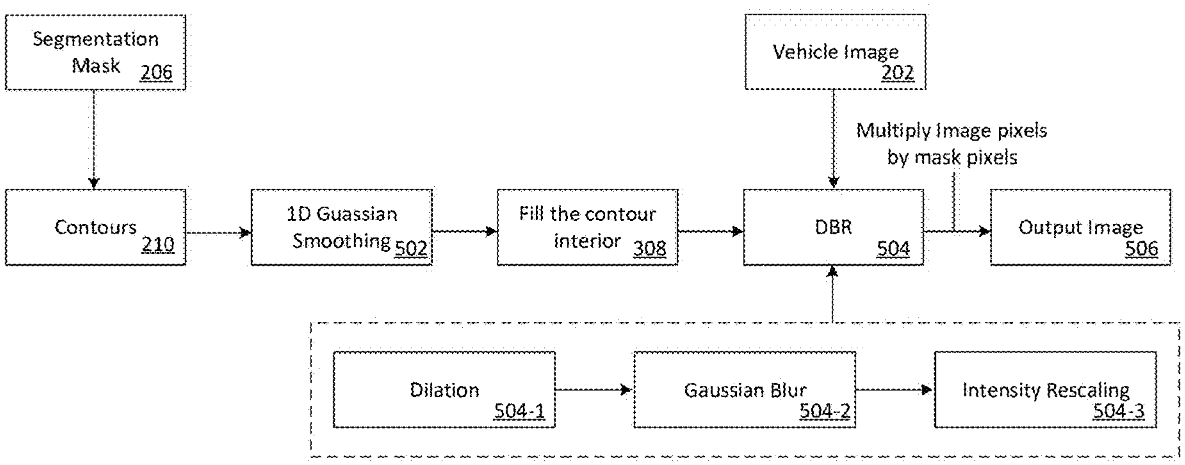
FIG. 5 depicts a graphical illustration for contour processing for an image object, according to some embodiments.
Figure 6:
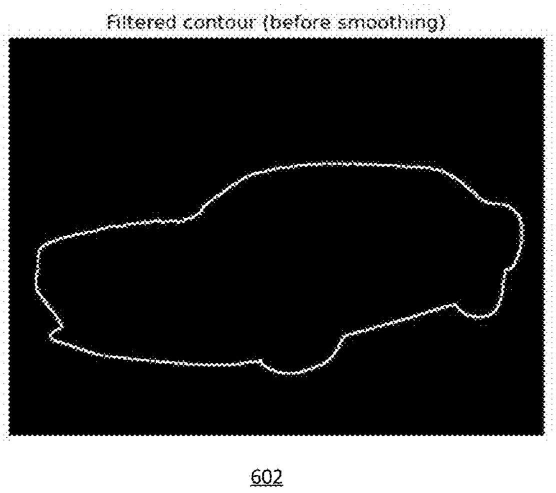
FIG. 6 depicts a graphical illustration for contour smoothing processing for an image object, according to some embodiments.
Figure 7:
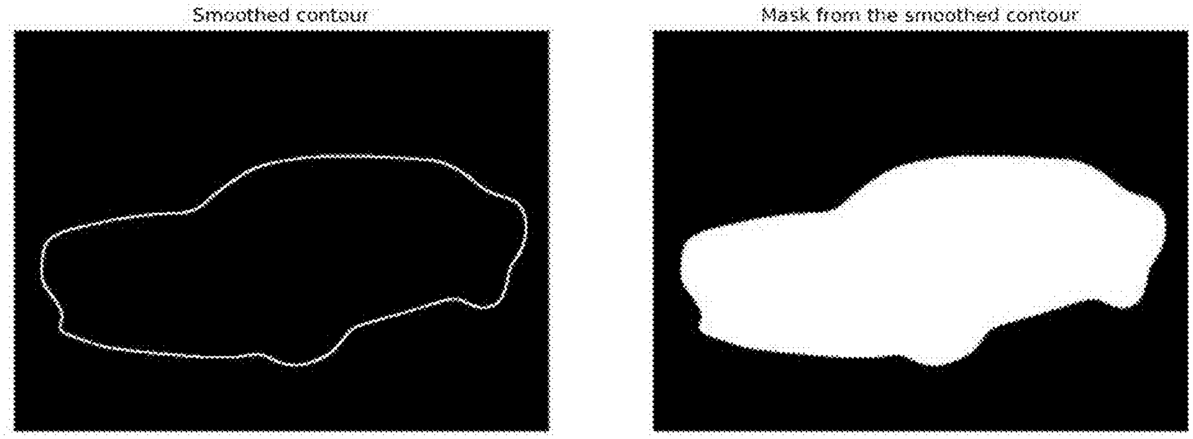
FIG. 7 depicts a graphical illustration for generating a segmentation mask from a smoothed contour of an image object, according to some embodiments.

In one processing stage 310, once filled, the processed segmentation mask generates a second version of the segmentation mask and may be used to remove the background or, in various embodiments, be further processed to improve the contour(s) of the segmentation mask as described in FIGS. 5-7.

Figure 4:
FIG. 4 depicts a graphical illustration of interior contours of an image object, according to some embodiments.
Figure 4:
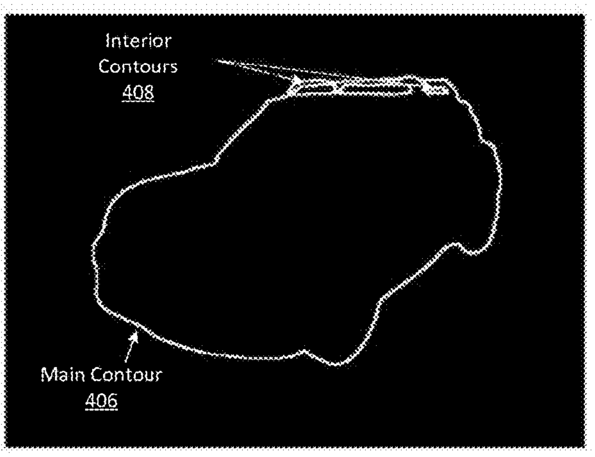

FIG. 4 depicts a graphical illustration of interior contours of an image object, according to some embodiments. Operations described may be implemented by processing logic that can comprise hardware (e.g., circuitry, dedicated logic, programmable logic, microcode, etc.), software (e.g., instructions executing on a processing device), or a combination thereof. It is to be appreciated that not all operations may be needed to perform the disclosure provided herein. Further, some of the operations may be performed simultaneously, or in a different order than described for FIG. 3, as will be understood by a person of ordinary skill in the art.

As illustrated in 402, a vehicle may include portions where holes in the segmentation mask may exist. For example, the illustrated vehicle in 402 may include a roof rack where interceding background image pixels may exist within the primary vehicle image pixels. When processing the segmentation mask 404, a main contour 406 (e.g., a largest contour) may be augmented with interior contours 408 to refine the segmentation mask. In some stages, during generation of the interior contours, the main exterior contours may correspond to a boundary between the foreground values (1's) and the background values (0's), with 0's outside and 1's inside. Analogously, the interior contours may correspond to a boundary between the foreground and background such that 1's are outside and 0's are inside. This hierarchical representation may ensure that the interior contours are represented as the children of the main contour. In some stages, selecting a contour and discarding the rest may entail selecting the contour hierarchy in which the main (e.g., root/parent) contour has the largest perimeter. In this aspect, all of the associated children may be automatically selected.

In various embodiments, generating the mask from a hierarchy may include filling a main contour with 1's or white pixels. In this scenario, interior contours that may correspond to a first sub-level in the hierarchy (e.g., direct/children/descendants) of the main contour, may be filled with 0's or black pixels to reflect one or more hole(s) in the main contour. In some aspects, if the perimeter of the interior contour is very small relative to the main contour (e.g., a small number of pixels), it may be categorized as a stray hole, and may ignored or discarded. In some aspects, if there are any further descendants (level two or higher), they may also be discarded.

FIG. 5 depicts a graphical illustration for contour processing for an image object, according to some embodiments.

Segmentation mask 206, contours 210, and filling the contour interior 308 may be implemented using any of the previous methods described herein. However, in some scenarios, contours may be jagged or include noise, such as unwanted pixels along the edge of the contours. In these scenarios, smoothing may be applied to improve the contours. For example, in some embodiments, contours may be first smoothed by applying Gaussian smoothing (1-dimensional) 502 to the contour. In this scenario, a contour may be represented as an array of coordinates (x and y) on the image space (e.g., when moving along the contour in the counter-clockwise direction). As a result, an array of x-coordinates and y-coordinates may be generated for the contour.

In a non-limiting example embodiment, 1D Gaussian smoothing may include, for each of the x and y arrays, replacing each coordinate value by a weighted average value of one or more neighboring coordinates, with the weights corresponding to a Gaussian distribution. For closed contours, each data point may have neighbors. A resulting location of a point in 2D space may be influenced by the location of its neighbors, with nearby neighbors exerting more influence than distant ones. Due to application of the 1D Gaussian function, small perturbations, such as, but not limited to, jagged edges, may be smoothed out, resulting in a smoother contour. In some aspects, a higher value of a sigma parameter of the 1D Gaussian function, may result in additional smoothing.

In some aspects, details, such as, but not limited to, sharp corners or turns in the contour, may be lost. Therefore, in various embodiments, a sigma may be chosen that provides a tradeoff between smoothing and retention of key features of the contour. One result of 1D Gaussian smoothing may be limited or no pixel-level blurring.

Smoothing is illustrated in FIG. 6, where 602 illustrates an example filtered contour (e.g., no strays) before smoothing and 604 illustrates the same filtered contour after smoothing. FIG. 7 illustrates the smoothed contours 604 and a subsequently generated segmentation mask 702 generated from the smoothed contours.

Dilation, Blurring and intensity Rescaling (DBR 504) of the segmentation mask 702 may include one or more processes to modify the mask. In 504-1, dilation slightly increases the size of the mask (e.g., 1%-5%) to prevent missing points (e.g., 1-5 pixels), edges, corners, vertexes, or points in the contour. The resulting segmentation mask may be applied to the original vehicle image to capture the pixels of the image object within the perimeter of the mask, resulting in an output image 506. For example, by multiplying the mask (all binary 1's) by the original image, the image object encapsulated by the mask may be extracted or separated from the background and may be subsequently be applied to a fixed background, for example, white or be applied to customized backgrounds, or blurred imagery.

In some embodiments, one technical solution may be to case a transition between foreground and background regions, as defined by the mask. If the mask is applied directly (e.g., all pixels in the image corresponding to the 1's in the mask retained and the rest, corresponding to 0's of the mask, removed), the edges may appear jagged. In some aspects, easing the transition may create a new mask that's no longer binary, but may have any value between 0 and 1 (or between 0 and 255), e.g., 0.4. Once the new mask is created, the mask may be multiplied with the image to generate an output that is no longer just 'on' or 'off'. For instance, a pixel value of (200, 150, 200), corresponding to Red, Green and Blue channels, with a mask value of 0.4, will have the final value of (80, 60, 80).

In some embodiments, one technical solution may be to dilate the mask. Dilation is a morphological operation involving geometrical structures of binary images, which enlarges white regions (corresponding to 1's) of the binary image.

In some embodiments, a blur may be applied as a 2D Gaussian blur to the mask, where a pixel value may be replaced by a weighted average of its neighboring pixels (e.g., along both horizontal and vertical dimensions), with the weights corresponding to a 2D Gaussian function. In this aspect, sharp transitions between white and black pixels may be smoothed, so that the edges are not sharp. However, the resulting mask may include a slow transition between white and black, meaning that parts of the background around the object may bleed into the output. In some aspects, to make this transition sharper, intensity rescaling may apply a transformation of the pixel values. In various stages, mapping is applied, to include, but not limited to, values less than a certain threshold, e.g., 0.94, may be mapped to 0 and values lying between 0.94 and 1 may be linearly mapped to lie between 0 and 1 instead (0.94→0, 0.97→0.5, 1→1, etc.).

The technology described herein improves the extraction of image objects from background objects and generates a realistic image object (e.g., expected) that may be added to one or more selected backgrounds. One technical solution disclosed includes the removal of stray segments during mask generation. One technical solution disclosed herein recognizes holes in the mask and generates interior contours to improve the mask by accounting for these holes that may be wanted or unwanted background pixels. For example, not all holes in the mask are unwanted, but those which are very small (e.g. below a threshold number of pixels) are most likely to be. One technical solution disclosed herein includes improvement of the segmentation mask by smoothing contours and/or edges. While described for a vehicle, the disclosed technology may be applied to any imagery.

Figure 8:
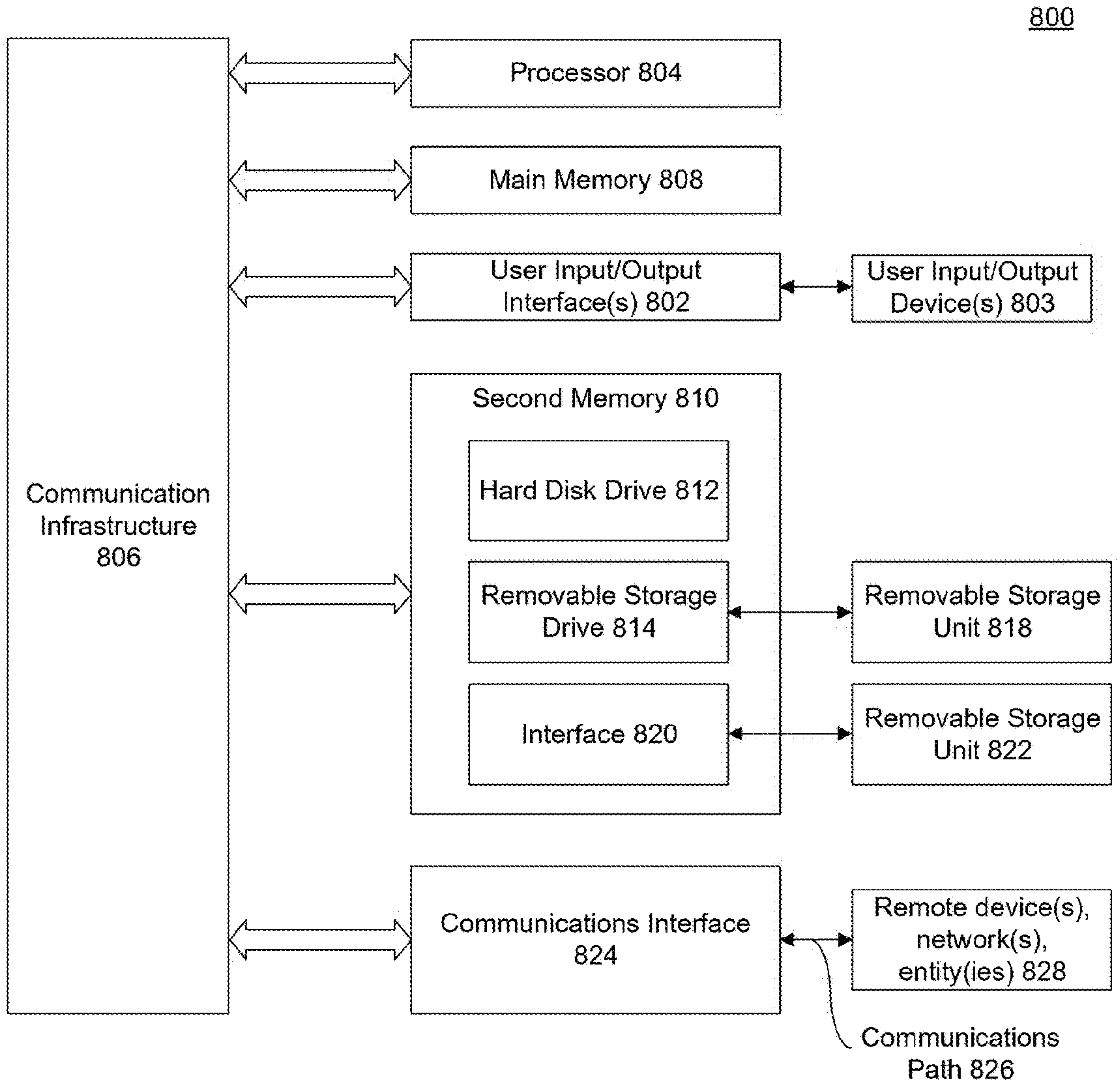
FIG. 8 depicts an example computer system useful for implementing various embodiments.

Various embodiments may be implemented, for example, using one or more well-known computer systems, such as computer system 800 shown in FIG. 8. One or more computer systems 800 may be used, for example, to implement any of the embodiments discussed herein, as well as combinations and sub-combinations thereof. Computer system 800 may include one or more processors (also called central processing units, or CPUs), such as a processor 804. Processor 804 may be connected to a communication infrastructure or bus 806.

Computer system 800 may also include user input/output device(s) 804, such as monitors, keyboards, pointing devices, etc., which may communicate with communication infrastructure 806 through user input/output interface(s) 802.

One or more of processors 804 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 may also include a main or primary memory 808, such as random access memory (RAM). Main memory 808 may include one or more levels of cache. Main memory 808 may have stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 may include a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 may read from and/or write to removable storage unit 818.

Secondary memory 810 may include other means, devices, components, instrumentalities or other approaches for allowing computer programs and/or other instructions and/or data to be accessed by computer system 800. Such means, devices, components, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 may enable computer system 800 to communicate and interact with any combination of external devices, external networks, external entities, etc. (individually and collectively referenced by reference number 828). For example, communication interface 824 may allow computer system 800 to communicate with external or remote devices 828 over communications path 826, which may be wired and/or wireless (or a combination thereof), and which may include any combination of LANs, WANs, the Internet, etc. Control logic and/or data may be transmitted to and from computer system 800 via communication path 826.

Computer system 800 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 800 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 800 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 8. In particular, embodiments can operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method to process digital imagery, the computer-implemented method comprising:

generating a first segmentation mask of an image object, wherein the first segmentation mask comprises at least an array of first pixels of the image object within the digital imagery and an array of second pixels located outside a perimeter boundary of the first segmentation mask;

extracting a plurality of contours from the digital imagery, wherein the plurality of contours comprises the array of the first pixels and the array of the second pixels;

generating a contour hierarchy of the plurality of contours, wherein the hierarchy is based on a length of each of the contours;

discarding, based on the contour hierarchy, all contours from the plurality of contours except a longest contour;

filling an interior of the longest contour to generate a second segmentation mask; and extracting the image object from the digital imagery using the second segmentation mask.

2. The computer-implemented method of claim 1, further comprising dilating the second segmentation mask.

3. The computer-implemented method of claim 2, further comprising blurring one or more pixels of a perimeter of the dilated second segmentation mask.

4. The computer-implemented method of claim 3, further comprising rescaling an intensity of the blurred one or more pixels to match pixels within the array of the first pixels of the image object.

5. The computer-implemented method of claim 1, further comprising smoothing the longest contour.

6. The computer-implemented method of claim 1, wherein the extracting the image object further comprises removing a background of the digital imagery.

7. The computer-implemented method of claim 1, wherein the plurality of contours each comprises at least a partially closed curve.

8. The computer-implemented method of claim 5, wherein the smoothing further comprises applying a one-dimensional Gaussian operator to the longest contour.

9. The computer-implemented method of claim 1, wherein the image object is a vehicle.

10. A system, comprising:

a memory; and one or more processors configured to:

generate a first segmentation mask of an image object, wherein the first segmentation mask comprises at least an array of first pixels of the image object within digital imagery and an array of second pixels located outside a perimeter boundary of the first segmentation mask;

extract a plurality of contours from the digital imagery, wherein the plurality of contours comprises the array of the first pixels and the array of the second pixels;

generate a contour hierarchy of the plurality of contours, wherein the hierarchy is based on a length of each of the contours;

discard, based on the contour hierarchy, all contours from the plurality of contours except a longest contour;

fill an interior of the longest contour to generate a second segmentation mask; and extract the image object from the digital imagery using the second segmentation mask.

11. The system of claim 10, further configured to dilate the second segmentation mask.

12. The system of claim 11, further configured to blur one or more pixels of a perimeter of the dilated second segmentation mask.

13. The system of claim 12, further configured to rescale an intensity of the blurred one or more pixels to match pixels within the array of the first pixels of the image object.

14. The system of claim 10, further configured to remove a background of the digital imagery.

15. The system of claim 10, further configured to smooth the longest contour.

16. The system of claim 10, further configured to apply a one-dimensional Gaussian operator to the longest contour.

17. The system of claim 10, wherein the image object is a vehicle.

18. A non-transitory computer-readable device having instructions stored thereon that, when executed by at least one computing device, cause the at least one computing device to perform operations comprising:

generating a first segmentation mask of an image object, wherein the first segmentation mask comprises at least an array of first pixels of the image object within digital imagery and an array of second pixels located outside a perimeter boundary of the first segmentation mask;

extracting a plurality of contours from the digital imagery, wherein the plurality of contours comprises the array of the first pixels and the array of the second pixels;

generating a contour hierarchy of the plurality of contours, wherein the hierarchy is based on a length of each of the contours;

discarding, based on the contour hierarchy, all contours from the plurality of contours except a longest contour;

filling an interior of the longest contour to generate a second segmentation mask; and extracting the image object from the digital imagery using the second segmentation mask.

19. The non-transitory computer-readable device of claim 18, further comprising operations to apply a one-dimensional Gaussian operator to the longest contour.

20. The non-transitory computer-readable device of claim 18, wherein the image object is a vehicle.

* * * * *